(12) United States Patent
Wolas et al.

(10) Patent No.: US 12,441,219 B2
(45) Date of Patent: Oct. 14, 2025

(54) AIR DISTRIBUTION DEVICE FOR A VEHICLE SEAT

(71) Applicant: GENTHERM INCORPORATED, Northville, MI (US)

(72) Inventors: Scott Wolas, Pasadena, CA (US); Ken Turner, Novi, MI (US); Amey Pise, Union City, CA (US)

(73) Assignee: GENTHERM INCORPORATED, Novi, MI (US)

( * ) Notice: Subject to any disclaimer, the term of this patent is extended or adjusted under 35 U.S.C. 154(b) by 244 days.

(21) Appl. No.: 17/778,437

(22) PCT Filed: Dec. 18, 2020

(86) PCT No.: PCT/US2020/065809
§ 371 (c)(1),
(2) Date: May 20, 2022

(87) PCT Pub. No.: WO2021/127314
PCT Pub. Date: Jun. 24, 2021

(65) Prior Publication Data
US 2023/0016878 A1 Jan. 19, 2023

Related U.S. Application Data (60) Provisional application No. 62/951,246, filed on Dec. 20, 2019.

(51) Int. Cl.
*B60N 2/56* (2006.01)
*B60H 1/00* (2006.01)

(52) U.S. Cl.
CPC ....... *B60N 2/5671* (2013.01); *B60H 1/00285* (2013.01)

(58) Field of Classification Search
CPC .......................... B60N 2/5671; B60H 1/00285
(Continued)

(56) References Cited

U.S. PATENT DOCUMENTS 5,042,566 A * 8/1991 Hildebrand ........ B60H 1/00678
454/145
5,062,352 A * 11/1991 Ostrand ............. B60H 1/00057
237/12.3 A (Continued)

FOREIGN PATENT DOCUMENTS

| CN | 103182972 | 7/2013 |
|----|-----------|--------|
| CN | 110290951 | 9/2019 |

(Continued)

OTHER PUBLICATIONS

International Search Report and Written Opinion dated Apr. 6, 2021, for International Application PCT/US2020/065809.

(Continued)

*Primary Examiner* — Justin C Mikowski
(74) *Attorney, Agent, or Firm* — The Dobrusin Law Firm, P.C.

(57) ABSTRACT

An air distribution device that includes an air inlet (44), a first air outlet (46), a second air outlet (48), and a door (52). The door (52) is configured to move relative to the first air outlet (46) and the second air outlet (48) to adjust an airflow provided through the air inlet (44), the first air outlet (46) and the second air outlet (48). The air distribution device may be used in a vehicle seat, a vehicle, or both.

15 Claims, 6 Drawing Sheets

(58) Field of Classification Search
USPC .................................................. 297/180.14
See application file for complete search history.

(56) References Cited

U.S. PATENT DOCUMENTS

| | | | | |
|---|---|---|---|---|
| 5,450,894 | A * | 9/1995 | Inoue ................. | B60H 1/00842 454/907 |
| 5,711,368 | A * | 1/1998 | Ito ..................... | B60H 1/00064 237/12.3 A |
| 6,113,483 | A * | 9/2000 | Schambre .......... | B60H 1/00842 454/121 |
| 6,244,335 | B1 * | 6/2001 | Nakamura ......... | B60H 1/00028 165/203 |
| 7,281,574 | B2 * | 10/2007 | Shibata .............. | B60H 1/00678 165/203 |
| 7,878,235 | B2 * | 2/2011 | Park ................... | B60H 1/00378 454/126 |
| 8,403,735 | B2 * | 3/2013 | Onda ................. | B60H 1/00685 454/145 |
| 8,544,533 | B2 * | 10/2013 | Lee .................... | B60H 1/00671 454/156 |
| 9,981,526 | B2 * | 5/2018 | Herrmann .......... | B60H 1/00064 |
| 10,532,628 | B2 * | 1/2020 | Wang ................. | B60H 1/00035 |
| 11,135,895 | B2 * | 10/2021 | Pinger ................ | B60H 1/00564 |
| 2002/0063451 | A1 | 5/2002 | Bargheer et al. | |
| 2004/0212211 | A1 * | 10/2004 | Beckley .............. | B60K 37/00 296/70 |
| 2009/0031742 | A1 * | 2/2009 | Seo .................... | B60H 1/00285 297/180.14 |
| 2018/0105147 | A1 * | 4/2018 | Iyer ................... | B60S 1/54 |
| 2018/0117987 | A1 * | 5/2018 | Yamaoka ............ | B60N 2/5657 |
| 2019/0366794 | A1 * | 12/2019 | Agathocleous ..... | B60H 1/00028 |
| 2021/0039476 | A1 * | 2/2021 | Suzuki ................ | B60H 1/3205 |
| 2021/0046799 | A1 * | 2/2021 | Spunar ............... | B60H 1/00671 |

FOREIGN PATENT DOCUMENTS

| | | | |
|---|---|---|---|
| CN | 110293811 A | 10/2019 | |
| DE | 10047754 A1 | 4/2002 | |
| DE | 102009052683 A1 | 5/2011 | |
| DE | 112017007059 T5 | 10/2019 | |
| DE | 112019005983 T5 | 9/2021 | |
| EP | 1203690 A2 | 5/2002 | |
| EP | 2072297 B1 | 7/2011 | |
| JP | 6500728 B2 * | 4/2019 | ............ B60H 1/00 |
| WO | 2007/135863 A1 | 11/2007 | |
| WO | WO-2008023641 A1 * | 2/2008 | ......... B60H 1/0005 |
| WO | WO-2016084332 A1 * | 6/2016 | ............ B60H 1/00 |
| WO | 2018/221975 A1 | 12/2018 | |

OTHER PUBLICATIONS

Chinese Office Action for CN Application No. 202080079165.6, dated May 31, 2025.
Chinese First Office Action dated Dec. 21, 2024, for Chinese Application 202080079165.6.
German Office Action dated Dec. 20, 2024, for German Application 11 2020 006 228.7.
Decision of Rejection Issued by CNIPA on Jul. 31, 2025, for CN 202080079165.6.

* cited by examiner

AIR DISTRIBUTION DEVICE FOR A VEHICLE SEAT

CROSS-REFERENCE TO RELATED APPLICATIONS

This application is a US National Stage Entry of PCT/US2020/065809, filed on Dec. 18, 2020, which claims priority to U.S. 62/951,246 filed on Dec. 20, 2019.

FIELD

These teachings relate generally to a ventilated vehicle seat, and more particularly to an air distribution device for altering or adjusting airflow to or between two or more seat effectors,

BACKGROUND

Some vehicles include one or a variety of features for improving occupant comfort. For example, some vehicles or vehicle seats include one or more air movers for moving warm, cold, or ambient air relative to an occupant.

While some currently available systems are adequate for their intended purpose, it may be desirable to improve the current state of the art. For example. some systems prevent individual seat effector control, and instead are operable to only deliver a constant airflow to a seat effector. Accordingly, it may be desirable to have a system or device that allows for regulation or adjustment of an airflow to one or mare seat effectors. It may be desirable to have a system or device that allows for regulation or adjustment of an airflow between two or more seat effectors. It may be desirable to have a device configured or operable to direct, adjust, or provide an airflow entirely to a first location, entirely to a second location, or split between the first location and the second location. It may be desirable to have a system or device according to these teachings.

SUMMARY

These teachings provide a system or device that allows for regulation or adjustment of an airflow to one or more seat effectors. The system or device according to these teachings advantageously allows for regulating or adjusting an airflow between two or more seat effectors. The device is configured or operable to direct, adjust, or provide an airflow entirely to a first location, entirely to a second location, or split between the first location and the second location. The airflow may be warm air, cold air, or ambient air. The device is an air distribution device. The device may be a valve. The valve may be a 3-way valve.

An air distribution device is disclosed that includes a first air outlet, a second air outlet, and a door. The door is configured to move relative to the first air outlet and the second air outlet to adjust an airflow provided to the first air outlet and the second air outlet. The air distribution device may be used in a vehicle seat, a vehicle, or both.

DETAILED DESCRIPTION

Vehicle as used herein may be any vehicle. For example, the vehicle may be a passenger car or truck, a motor home, train, airplane, boat, and/or off-road vehicle. The cabin may be any portion of the vehicle where one or more occupants or goods may be seated, stored, or transported.

Vehicle seat as used herein may be any seat or device that may be used to support an occupant or goods. The vehicle seat may include one or more cushions or other support devices on which or against which an occupant or goods may be seated, stored, or transported. The vehicle may be a front seat (i.e., driver and/or passenger seat and/or a rear seat. The vehicle seat may be sized to accommodate one occupant or more than one occupant.

The air distribution system may be any system and/or device configured or operable to direct air towards, at, away from, or into a region of the vehicle, cabin, vehicle seat, an occupant, or a combination thereof. The directed air may be conditioned air (i.e., warm air or cold air), ambient air, or a mixture or combination of conditioned air and ambient air. Ambient air be air inside of the cabin of the vehicle, air located inside any other portion of the vehicle like a trunk, or air located outside of the vehicle.

The air distribution system may include one or more air distribution devices. An air distribution device may be any device, apparatus, or combination of devices or apparatuses that function to distribute, deflect, and/or guide a flow of air to one or more areas or regions of interest. The air distribution device may be a valve. The air distribution device may be a 3-way valve.

The air distribution device may have one or more air inlets. One or more of the inlets may be connected to one or more sources of air. The source of air may be conditioned air (warm and/or cold air), ambient air (air in a cabin of the vehicle, air surrounding an outside of the vehicle, or both). The one or more inlets may have a cross-section that is generally round or circular, oval, rectangular, or any other shape.

The air distribution device may have one or more air outlets. The one or more outlets may be one or more of the seat effectors. The one or more outlets may be connected to the one or more seat effectors by way of one or more ducts, tubes, or other passageways. The one or more outlets may have a cross-section that is generally round or circular, oval, rectangular, or any other shape The air distribution device may have two or more outlets. The outlets may be nested together such that one outlet is arranged within or share a common longitudinal axis (See, for example, FIG. 8A, where outlet 146 is located at least partially within outlet 148. That is, outlet 146 may be part of a tube or duct that extends through outlet 148. In other configurations, the two or more outlets may be individual outlets that are not arranged along a common axis. For example, the two or more outlets may extend along axis that are adjacent or offset one another (side to side horizontally offset and/or up and down vertically offset)

The one or more inlets may be generally aligned with one or more of the outlets. The one or more inlets may be generally aligned with two or more of the outlets. This means that a flow path of the air between the one or more inlets and the one or more or two or more outlets may be generally aligned such that air flow is not substantially redirected or deflected before exiting the air distribution device. For example, the air flow between the inlet and the one or more outlets may be substantially linear and/or flow along a generally straight path. Advantageously, by having an air flow that flows along a substantially linear path and/or flows along a generally straight path between the inlet and outlet(s), the air distribution device may have reduced or minimized flow resistance through the air distribution device; reduced or minimized vibration and thus reduced or minimized noise; or both, as compared to systems where an air flow may follow a substantially non-linear path through the air distribution device. A substantially non-linear flow path may be, for example, a device where the air flow path is directed, guided, deflected, and/or redirected between an inlet and one or more outlets to have substantially turns before exiting the device. Moreover, a substantially linear flow path that is substantially straight between the inlet and outlet(s), may maintain a substantially constant air pressure between the inlet and outlet(s) compared to non-linear flow path devices. A substantially linear and/or flow path that is substantially straight between the inlet and outlet(s), may also minimize flow resistance and minimize flow turbulence, while promoting a laminar air flow between the air inlet and outlet(s).

The air distribution system may include one or more air movers. An air mover may be any device or combination of device configured or operable to move air. An air mover may create or generate the airflow that is directed or guided into the air inlet of the air distribution device. The air mover may increase a flow, speed, or velocity of the air. The air more may decrease a flow, speed, or velocity of the air. The air mover may be a fan. The air mover may be a radial fan. The air mover may be an axial fan. The air mover may direct air from one or more or two or more sources of air into the air distribution device. The sources of air may be a warm air source, a cold air source, or ambient air source. The air mover may be located downstream of the air distribution device and may pull or suction air into the air distribution device. The air mover may be located upstream of the air distribution device and may push air into the air distribution device. The air mover may switch between pulling and pushing air into the air distribution device.

The air distribution device comprises one or more doors. The one or more doors may be moved to block, obstruct, choke, or reduce a size of one or more of the air outlets. Each door may be configured to move and block or obstruct one or more air outlets. For example, the air distribution device may have a dedicated door to block or obstruct air outlet. Alternatively, the air distribution device may have one door that is configured to block or obstruct two or more air outlets. By blocking, obstructing, choking, or reducing a size of one or more air outlets with the door, an amount of airflow provided through the air outlet and/or into the respective duct and/or to the corresponding seat effectors is reduced, minimized, or completely eliminated.

The one or more doors may be configured to move to unblock, open, unchoke, or increase a size of one or more of the air outlets. By unblocking, unchoking, opening, or increasing a size of one or more air outlets with the door, an amount of airflow provided through the air outlet and/or into the respective duct and/or to the corresponding seat effectors is turned on, increased, or maximized.

The door may be moved or rotated or pivoted about an axis to block or unblock one or more of the air outlets. The rotational axis may be aligned with an axis or flow of the airflow through the air distribution device. The rotational axis may be angled, for example generally perpendicular to, an axis or flow of the airflow through the air distribution device. The axis or pivot may comprise a pin, an axle, a bushing, a bearing, a slot, a projection, or a combination thereof. The door may rotate in a clockwise direction between the various door positions. The door may rotate in a counter-clockwise direction between the various door positions. The door may rotate in a clockwise and then counter-clockwise direction between the various door positions. The door may oscillate between the various door positions. The door may be folded and unfolded between the door positions. The door may be moved by lowering and raising the door between the door position. The door may be moved by contracting and expanding the door between the door positions. The door may be moved by compressing and uncompressing the door between the door positions. The door may be moved by folding and unfolding the door between the door positions. The door may be slid along or about an axis to block or unblock the one or more air outlets. The door may be rotated about an axis to block or unblock the one or more air outlets. The door may be both slid and rotated about an axis to block or unblock the one or more air outlets, The door may be movable via one or more actuators, motors, or other applicable devices. The door may be moved by an electric control. The door may be moved when a user sets a desired airflow speed or velocity they wish to have directed towards or away from them inside the cabin of the vehicle. In response to the set airflow velocity or location, the door may be moved into a corresponding position to at least partially open or close one or more corresponding outlets or ducts. The door may be moved by a manual control. For example, a user or operator may manually turn a knob or slide a slider, which may correspondingly move the door into a corresponding position to block or unblock one or more outlets or to increase or decrease a size or opening of the one or more outlets to increase or decrease the amount of airflow or flow rate that passes through the air distribution device.

The door may have a barrel shape. A barrel shaped door is advantageous because a smaller, or lower torque actuator can be used to move the door since the door does not have to resist the force of airflow that a flat or planar type of door may see. The door may have a curved portion or wall. The door may resemble a scoop. The curved portion or wall of the door may have one or more apertures, notches, or holes that may at least partially align with one or more of the air outlets so allow the airflow to flow or move into/through the outlet. The one or more apertures, notches, or holes may be located at any portion of the door, including at an edge region, at a center region, or at any lateral position relative to a longitudinal axis of the air distribution device. The door may have a planar wall, a concave scooped wall, a convex scoop wall, or a combination thereof. The door may be substantially rigid. The door may be substantially complaint or flexible to aid in sealing in one or more of the door positions. The door may be a flap of substantially flexible material. The door may be a flexible member that bends or deforms during movement and/or sealing. The door may be a rigid member that does not bend or deform during movement and/or sealing.

The door may have one or more seals to reduce or prevent air flow into or through one or more of the air outlets when the door is partially or completely blocking or obstructing the air outlet. This may advantageously prevent or reduce air leaking when little or no airflow is desired through from a corresponding seat effector. The one or more seals may be located at any surface or edge of the door. The one or more seals may be a foam, rubber, EPDM, TPU, TPE, etc. The one or more seals may include a lubricant to allow the door to freely move or slide or rotate between the one or more positions described herein. The door or the one or more seals may contact a wall or housing defining the device, and/or the one or more openings to restrict or prevent air from flowing therethrough The door can be moved between one or more positions by rotating in a clockwise direction, counterclockwise direction, or both. The door may be moved or slid along an axis (i.e., not rotated). The door can be moved or slid via one or more actuators, motors, stepper motors, cams, links, bearings, linear bearings, or other mechanisms.

The air distribution system comprises one or more ducts. The one or more ducts may function to lead or direct the airflow from the air mover or air distribution device to the one or more seat effectors. The one or more ducts may have any suitable length or cross section. The one or more ducts may have a constant cross section, or the cross section may narrow, taper, or increase in order to mechanically effect the air flow. One or more of the ducts may include one or more diverters to split the duct into two or more sub ducts to further guide the airflow to additional seat effectors. This may be advantageous in order to further distribute airflow to desired locations inside the vehicle.

The system may include one or more actuators. The actuator may comprise a motor, a computer or controller, one or more links, or a combination thereof. The actuator may be located inside of a housing of the air distribution device. The actuator may be located outside of a housing of the air distribution device. The one or more actuators may comprise a stepper motor or a servo motor. The door can be moved or slid via one or more actuators, motors, stepper motors, cams, links, bearings, linear bearings, or other mechanisms.

The device or system may include one or more computers, processors, memories, look up tables, etc. Computer, whether part of the actuator or electrically connected to the actuator, is configured to determine a position of the door relative to the one or more air outlets. The computer may comprise a memory, a processor, or both. Based on one or more occupant selected variables, such as a desired air flow outlet speed or velocity, or locations where an occupant wishes to have air moved relative to them, the computer may control the actuator to move or rotate the door into the corresponding position to block or unblock one or more of the air outlets to alter or adjust an airflow to or between two or more seat effectors.

The seat effectors may be any outlet or aperture or passage through which air from the air distribution device is directed into the cabin of the vehicle. The seat effector may comprise a grill or air diffuser to spread or direct an airflow exiting the seat effector. The grill or air diffuser may be adjusted to change a direction of the airflow. The seat effectors may be located anywhere on the seat, including in or at a region of the headrest, backrest portion, seating portion, bolster, or a combination thereof. In some configurations, the air distribution system may be configured or operable for other areas of the vehicle other than a vehicle seat, such as for altering or adjusting an air flow to or between two or more effectors located in the vehicle dashboard, headliner, door panels, footwells, or a combination thereof. The one or more seat effectors may be arranged to blow or move air towards, away from, or in a region of an occupant's head, neck, shoulders, back, chest, arms, hands, torso, legs, feet, or a combination thereof.

Figure 1:
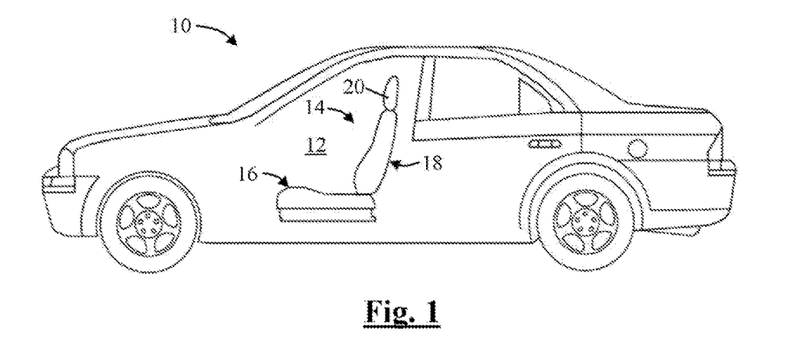
FIG. 1 illustrates a vehicle and a vehicle seat.

A vehicle 10 is shown in FIG. 1. The vehicle 10 comprises a cabin 12 that includes one or more vehicle seats 14. The vehicle seat 14 comprises a seating portion 16, a backrest portion 18, and a headrest 20.

Figure 2:
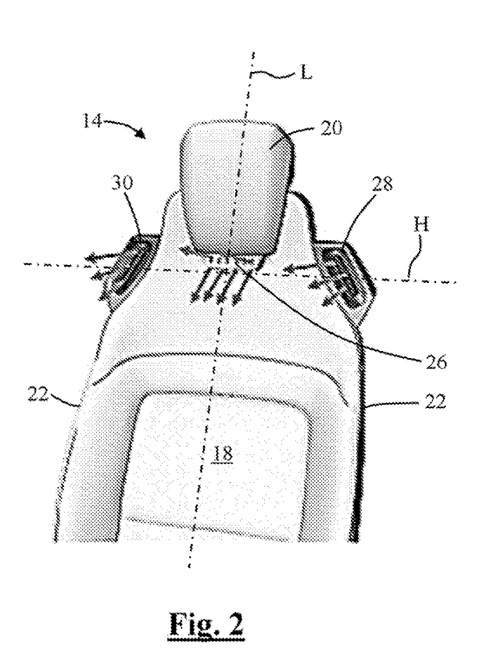
FIG. 2 is a perspective view of the vehicle seat that includes two seat effectors.

FIG. 2 illustrates the vehicle seat 14. The backrest portion 18 of the seat 14 comprises opposing seat edges 22. An air distribution system 24 (exemplary shown in FIG. 3) is attached to the vehicle seat 14. The air distribution system 24 comprises a first seat effector 26 and a pair of second seat effectors 28, 30. The first seat effector 26 may be disposed in a region of the headrest 20, for example, at or below the headrest 20. The first seat effector 26 may be generally aligned with or positioned in a region a neck region of an occupant in the vehicle seat 14. The first seat effector 26 may be aligned with a longitudinal axis L of the seat 20. The first seat effector 26 may be offset to one side or the other of the axis L.

The first seat effector 26 may be disposed between the second seat effectors 28, 30. In some configurations, the three effectors 26, 28, 30 may be generally aligned along a horizontal axis H. In other configurations, one or more of the effectors 26, 28, 30 may be arranged above or below or offset relative to the axis H. The second seat effectors 28, 30 are disposed on the opposing edges 22 of the backrest portion 18. The second seat effectors 28, 30 may be generally aligned with or positioned at a region the shoulder regions or back of an occupant in the vehicle seat 14. In other configurations, the second effectors 28, 30 may be arranged at a region of the mid or lower back of an occupant. In other configurations, the system 24 may be arranged in a bottom portion of the seat; thus, the first, second and third effectors 26, 28, 30 can be arranged at any portion of the seat bottom. Additionally, or alternatively, it is understood that there may be additional first effectors 26 and/or additional second effectors 28, 30. For example, another first effector 26 may be located in a region of the lower back of an occupant. For example, another second effector 28 and/or 30 may be located in a region of the lower back of an occupant.

Figure 3:
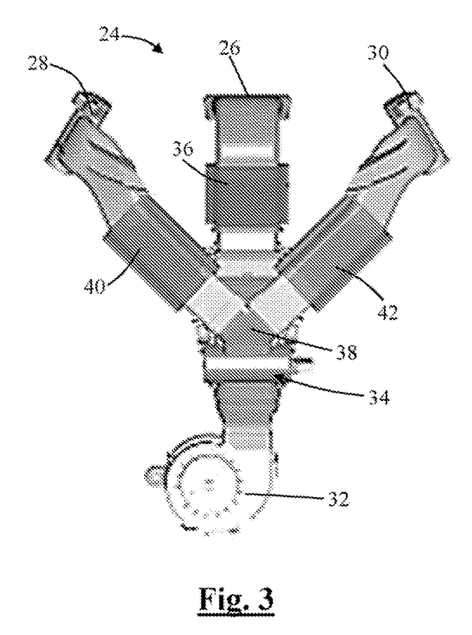
FIG. 3 is a front view of an air distribution system

Referring now to FIG. 3, the air distribution system 24 comprises an air mover 32, an air distribution device 34 connected to the air mover 32 and located downstream of the air mover 32, and first and second ducts 36, 38 fluidly connected to first and second air outlets of the air distribution device 34, which are illustrated and identified in the next figures.

The first duct 36 leads to and is in fluid communication with the first seat effector 26. The second duct 38 includes a diverter that splits the second duct 38 into two sub ducts 40, 42. Sub duct 40 leads to and is in fluid communication with the second seat effector 28, and sub duct 42 leads to and is in fluid communication with the second seat effector 30. The system 24 can be attached to a back side of the seat. The system 24 may be exposed on the back side of the seat, or the system 24 may be covered by a shell or other protective and/or concealing layer of the seat. Of course, if the system 24 is incorporated into a seat bottom, then the system would be located below the seat bottom or cushion or integrated therein.

If the system includes additional effectors 26, 28, 30 as discussed above, the system 24 may include additional ducts, splitters, diverters, air movers, etc.

Figure 4:
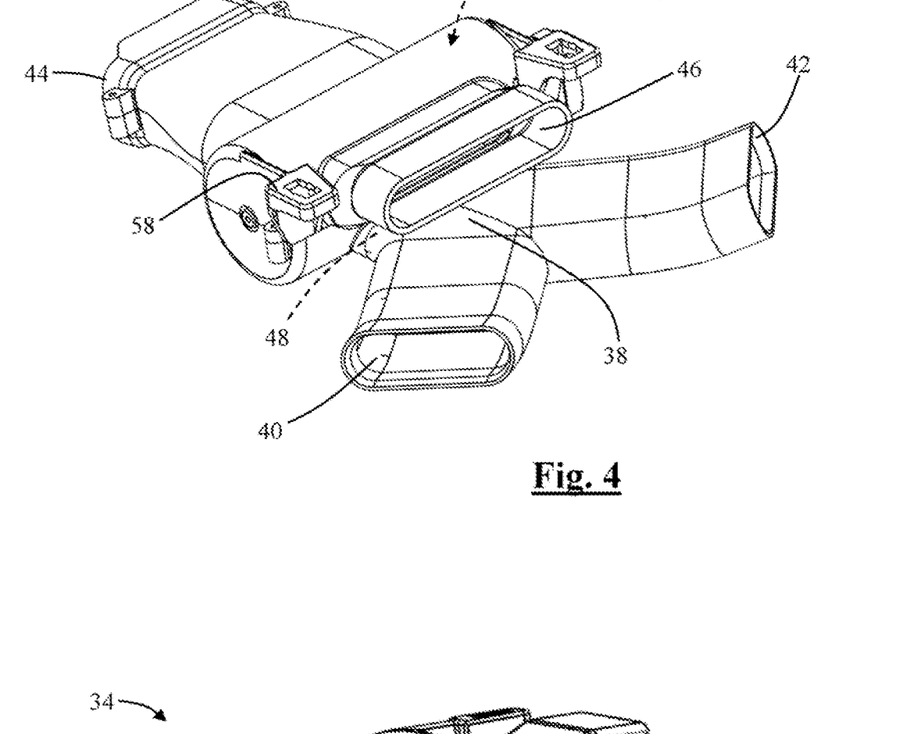
FIG. 4 is a perspective view of an air distribution device.
Figure 5:
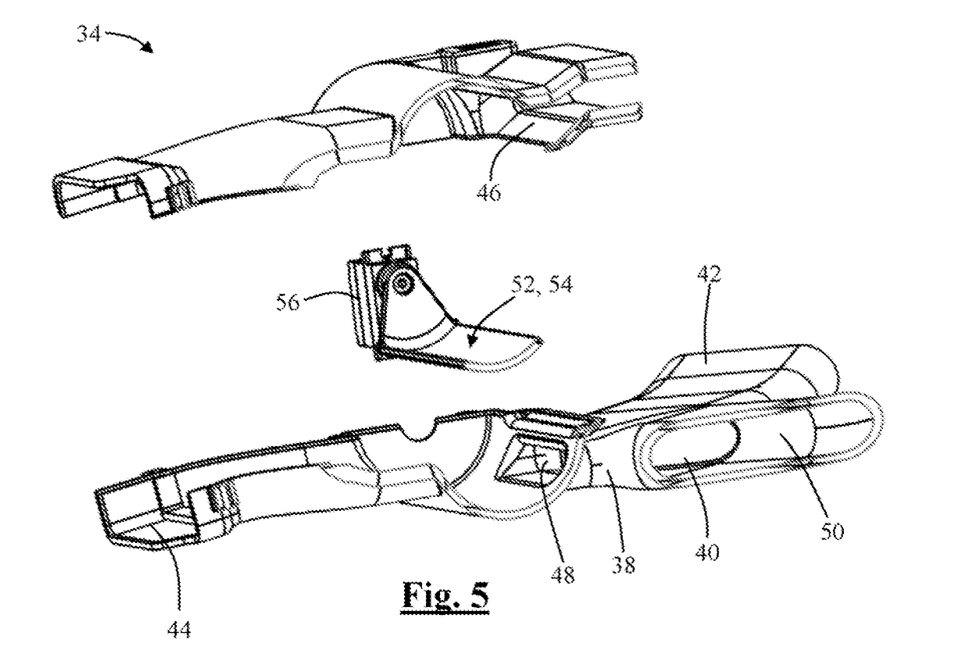
FIG. 5 is an exploded, perspective view of the air distribution device of FIG. 4.

FIGS. 4 and 5 illustrate the air distribution device 34. The air distribution device comprises an air inlet 44, a first air outlet 46, and a second air outlet 48. The air inlet 44 is configured to receive an input airflow from the air mover 32 (FIG. 3). The first air outlet 46 is fluidly connected to the first duct 36 (FIG. 3) and ultimately to the first seat effector 26 (FIGS. 2 and 3). The second air outlet 48 is fluidly connected to the second duct 38 (FIG. 3). The second duct 38 comprises a diverter 50, which then splits the second duct 38 into sub ducts 40, 42 (See also FIG. 3). Sub duct 40 is fluidly connected to second seat effector 28 (FIGS. 2, 3) and sub duct 42 is fluidly connected to second seat effector 30 (FIGS. 2, 3).

The air distribution device 34 comprises a door 52. The door 52 comprises a curved or scooped portion 54. The door 52 is operably connected to an actuator 56 that is configured to move or rotate the door 52 into or between a plurality of door positions relative to the air outlets 46, 48. These positions are illustrated in the following FIGS. 6A-6D (and also FIGS. 7 and 8A-8D). The air distribution device 34 comprises one or more mounting features 58 for attaching or mounting the device 34, the air mover 32, and/or the system 24 to the vehicle 10, the vehicle seat 14, a frame, cushion, seat suspension, or any other desired feature.

Figure 6A:
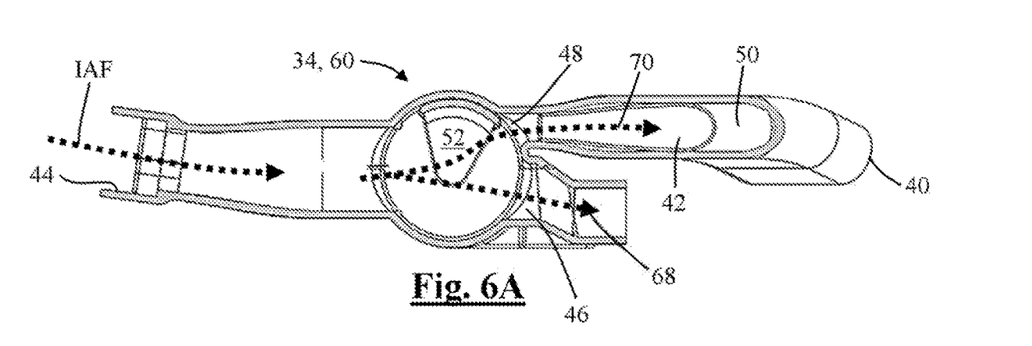
FIG. 6A is a cross-sectional view of the air distribution device with the door in a first position.

FIG. 6A illustrates the door 52 in a first door position 60. After the door 52 is rotated into the first door position 60 by the actuator, both of the first and second air outlets 46, 48 are at least partially unobstructed or free from being blocked by the door 52. Accordingly, when the door 52 is in the first door position 60, an input airflow IAF from the air mover 32 (FIG. 2) is configured to flow into the air distribution device 34 through the air inlet 44 and then pass into and through both of the first and second air outlets 46, 48 along a respective first air flow path 68 and second air flow path 70 and then exit the device 34. The first air flow path 68 is configured to then flow into and through the first duct 36 (FIG. 3) and ultimately exit the air distribution system 24 at the first seat effector 26 (FIGS. 2 and 3). At the same time, the second airflow path 70 is configured to flow through the second duct 38 (FIG. 3). through each of the sub ducts 40, 42, and ultimately exit the air distribution system 24 at the second seat effectors 28, 30 (FIGS. 2 and 3).

Figure 6B:
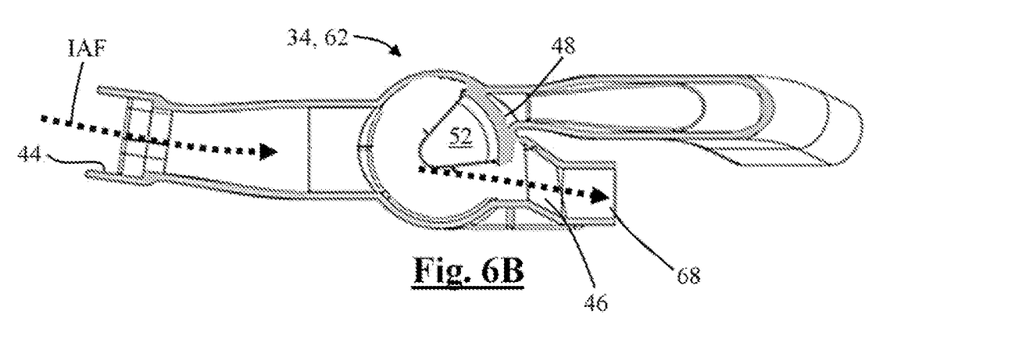
FIG. 6B is a cross-sectional view of the air distribution device with the door in a second position.

FIG. 6B illustrates the door 52 in a second door position 62. After the door 52 is rotated into the second door position 62, only the first air outlet 46 is at least partially unobstructed or free from being blocked by the door 52, in the second door position 62, the second air outlet 48 is blocked or obstructed by the door 52. Accordingly, when the door 52 is in the second door position 62, the input air flow IAF from the air mover 32 (FIG. 2) is configured to flow into the air distribution device 34 through the air inlet 44 and then pass into and through only the first air outlet 46 along the first air flow path 68. The first air flow path 68 is configured to then exit the device 34 through the first duct 36 (FIG. 3) and ultimately exit the air distribution system 24 via the first seat effector 26 (FIGS. 2 and 3). Because the door 52 blocks or obstructs the second air outlet 48, there is no second air flow path 70. Accordingly, air does not flow through the second duct 38 (FIG. 3), through any of the sub ducts 40, 42, or exit the air distribution system 24 through the second seat effectors 28, 30 (FIGS. 2 and 3).

Figure 6C:
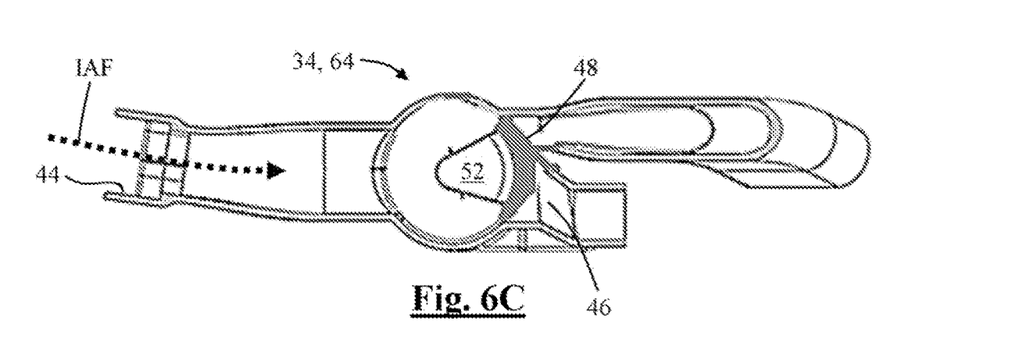
FIG. 6C is a cross-sectional view of the air distribution device with the door in a third position.

FIG. 6C illustrates the door 52 in a third door position 64. After the door 52 is rotated into the third door position 64, both of the first air outlet 46 and the second air outlet 48 are blocked or obstructed by the door 52. When the door 52 is in the third door position 64. because the door 52 blocks or obstructs both of the air outlet 46, 48, there is no first or second air flow paths 68, 70. Accordingly, no air flows through the first and second ducts 36, 38, the sub ducts 40, 42, or exits through any of the seat effectors 26, 28, 30.

Figure 6D:
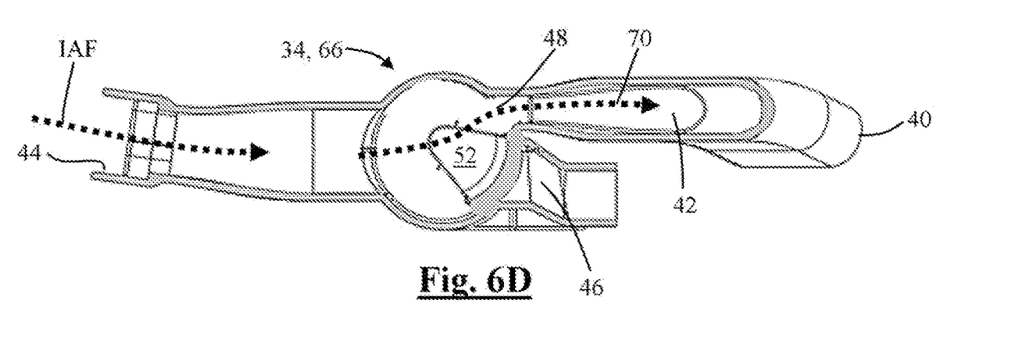
FIG. 6D is a cross-sectional view of the air distribution device with the door in a fourth position.

FIG. 6D illustrates the door 52 in a fourth door position 66. After the door 52 is rotated into the fourth door position 66, only the second air outlet 48 is at least partially unobstructed or free from being blocked by the door 52. in the fourth door position 64, the first air outlet 46 is blocked or obstructed by the door 52. Accordingly, when the door 52 is in the fourth door position 64, the input air flow IAF from the air mover 32 is configured to flow into the air distribution device 34 through the air inlet 44 and then pass into and through only the second air outlet 48 along the second air flow path 70. The second air flow path 70 is then configured to flow exit the device 34 through the second duct 38 (FIG. 3), the sub ducts 40, 42, and ultimately exit the air distribution system 24 through the second seat effectors 28, 30. Because the door 52 blocks or obstructs the first air outlet 46, there is no first air flow path 68. Accordingly, air does not flow through the first duct 36 (FIG. 3) or exit the air distribution system 24 through the first seat effectors 26 (FIGS. 2 and 3).

Further clockwise rotation of the door 52 from the fourth door position 66 may result in the door 52 being in another first door position, where both of the first and second air outlets 46, 48 are at least partially unobstructed or free from being blocked by the door 52. Accordingly, an input airflow IAF from the air mover 32 (FIG. 2) is configured to flow into the air distribution device 34 through the air inlet 44 and then pass into and through both of the first and second air outlets 46, 48 along a respective first air flow path 68 and second air flow path 70 and then exit the device 34.

The door 52 may be moved into yet another position, where one of the outlets 46, 48, is more obstructed by the door 52 than the other outlet 46, 48. For example, this may be a door position between the third door position 64 (FIG. 6C) and the fourth door position 66 (FIG. 6D), where some air flow can pass into or through outlet 48 and some through outlet 46. This may allow a user or system to reduce or control the amount of airflow passing through the corresponding outlets 46, 48. In other words, depending on the rotational position of the door 52 relative to the outlets 46, 48, more airflow may be directed into or through one of the outlets 46, 48 than through the other outlet 46, 48. For example, more air flow may be directed through outlet 46 than 48 if the door 52 only partially blocks outlet 48, or vice versa. By limiting or changing the amount of airflow that enters an outlet 46, 48, the amount of airflow expelled by the effectors can be modified, controlled, or changed. This may be advantageous when an occupant wishes to have more airflow through certain effectors, but less airflow from other effectors.

Figure 7:
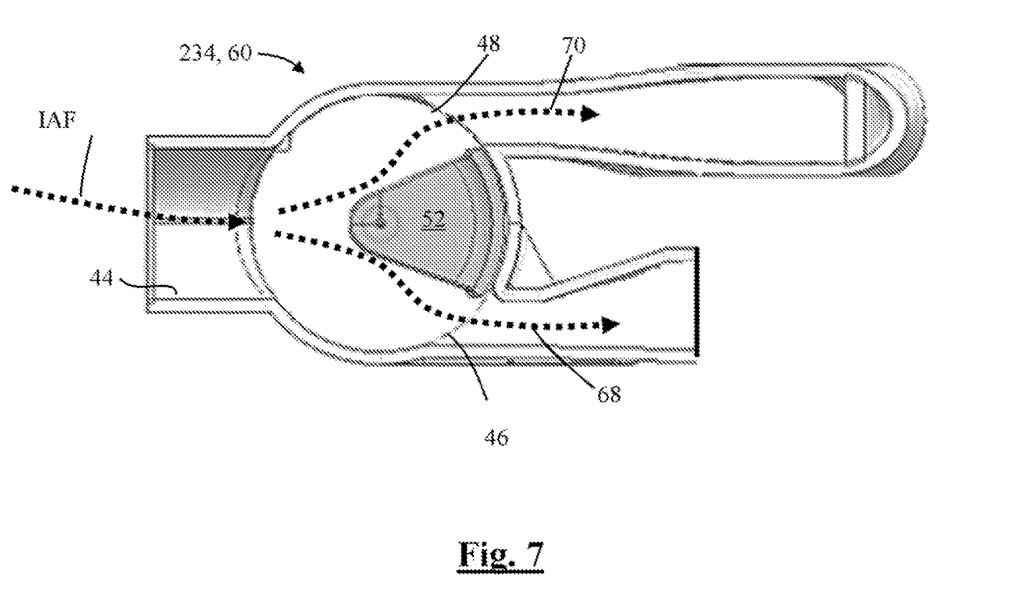
FIG. 7 is a cross-sectional view of the air distribution device with the door in a first position.

Another air distribution device 234 is illustrated in FIG. 7. The air distribution device 134 may be used in place of the air distribution device 34 illustrated and described above and/or the device 134 illustrated and described below. The air distribution device 234 includes many of the same features illustrated and described above in FIGS. 6A-6D and in the figures below; thus, in the interest of brevity the like similar features will not be repeated again. However, it is understood those teachings from the other figures and paragraphs herein can be applied to FIG. 7 and vice versa.

The air distribution device 234 in FIG. 7 is illustrated in the first door position 60. In the first door position 60, the first and second air outlets 46, 48 are at least partially unobstructed or free from being blocked by the door 52. Accordingly, when the door 52 is in the first door position 60, an input airflow IAF from the air mover 32 (FIG. 2) is configured to flow into the air distribution device 234 through the air inlet 44 and then pass into and through both of the first and second air outlets 46, 48 along a respective first air flow path 68 and second air flow path 70 and then exit the device 34. The first air flow path 68 is configured to then flow into and through the first duct 36 (FIG. 3) and ultimately exit the air distribution system 24 at the first seat effector 26 (FIGS. 2 and 3). At the same time, the second airflow path 70 is configured to flow through the second duct 38 (FIG. 3), through each of the sub ducts 40, 42, and ultimately exit the air distribution system 24 at the second seat effectors 28, 30 (FIGS. 2 and 3).

In the first door position 60, one of the outlets 46, 48, may be more obstructed by the door 52 than the other to reduce or control the amount of airflow through the corresponding outlets 46, 48. In other words, depending on the rotational position of the door 52 relative to the outlets 46, 48, more of the airflow may be directed to or through one of the outlets 46, 48 than through the other outlet 46, 48. For example, by rotating the door 52 slightly counterclockwise, more air flow may be directed through outlet 46 than outlet 48 because the door 52 will be partially obstructing outlet 48. In contrast, by rotating the door 52 slightly clockwise, more air flow may be directed through outlet 48 than outlet 46 because the door 52 will be partially obstructing outlet 46. This may be advantageous when an occupant wishes to have more airflow through certain effectors, but less airflow from other effectors.

The door 52 can be rotated into a second door position (not illustrated). That is, the door 52 can be rotated counterclockwise from the first door position 60 illustrated in FIG. 7 so that only the first air outlet 46 is at least partially unobstructed or free from being blocked by the door 52. In the second door position, the second air outlet 48 is blocked or obstructed by the door 52. Accordingly, when the door 52 is in the second door position, the input air flow IAF from the air mover 32 (FIG. 2) is configured to flow into the air distribution device 34 through the air inlet 44 and then pass into and through only the first air outlet 46 along the first air flow path 68. Because the door 52 blocks or obstructs the second air outlet 48, there is no second air flow path 70. Accordingly, air does not flow through the second duct 38 (FIG. 3), through any of the sub ducts 40, 42, or exit the air distribution system 24 through the second seat effectors 28, 30 (FIGS. 2 and 3).

The door 52 can be rotated into a third door position (not illustrated). That is, the door 52 can be rotated clockwise from the first door position 60 illustrated in FIG. 7 so that only the second air outlet 48 is at least partially unobstructed or free from being blocked by the door 52. In the third door position, the first air outlet 46 is blocked or obstructed by the door 52. Accordingly, when the door 52 is in the third door position, the input air flow IAF from the air mover 32 (FIG. 2) is configured to flow into the air distribution device 34 through the air inlet 44 and then pass into and through only the second air outlet 48 along the second air flow path 70. Because the door 52 blocks or obstructs the first air outlet 46, there is no first air flow path 68.

It may be appreciated that the door 52 in the air distribution device 234 of FIG. 7 may move between the first door position and the fourth door position without passing through the second door and/or third positions. In other words, with reference back to FIGS. 6A-6D, when the door 52 of the device 34 is in the first door position 60 (FIG. 6A), the door 52 must move into and past the second door position 62 (FIG. 6B) where the opening 48 is blocked and then unblocked before the door 52 can move into the third and then the fourth door position 66 (FIG. 6D) to block opening 46. This may cause a time delay between moving through the different door positions. This may also cause a temporary blocking or interruption of ventilation when the opening 48 is momentarily blocked while the door 52 is moved into the fourth door position 66. In contrast, the door 52 in device 234 of FIG. 7 may move from the illustrated first door position to the fourth door position by rotating the door clockwise to cover or block opening 46, without having any effect on blocking and then unblocking opening 48. Moreover, the range of motion to move the door 52 in the device 234 is smaller than in device 34. This may advantageously provide for a smaller required packaging space, smaller or less complex motor and/or actuator, smaller and/or less complex links or mechanisms between the door and actuator 52

Another example, of this is when moving the door 52 from fourth door position 66 (FIG. 6D) to the first door position 60 (FIG. 6A), where the door 52 must be moved into the second door position 62 (FIG. 6B) where the opening 48 is momentarily blocked and then into the first door position 60 (FIG. 6A) where the opening 48 is again unblocked or unobstructed. The door 52 in device 234 of FIG. 7 may move from the fourth position to the illustrated first door position by similarly rotating the door counterclockwise without having any effect on blocking and then unblocking opening 48.

Another air distribution device 134 is illustrated in FIGS. 8A-8D. The air distribution device 134 may be used in place of the air distribution device 34 and/or 234 illustrated and described above.

Figure 8A:
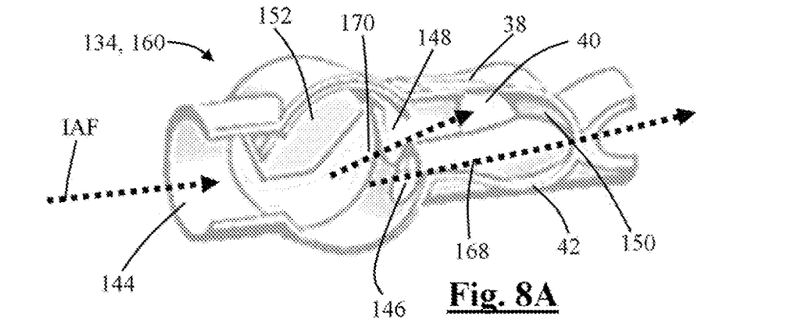
FIG. 8A is a cross-sectional view of the air distribution device with the door in a first position.

Referring specifically to FIG. 8A, the air distribution device 134 comprises an air inlet 144, a first air outlet 146. and a second air outlet 148. The air inlet 44 is configured to receive an input air flow IAF from the air mover 32 (FIG. 3). The first air outlet 146 is fluidly connected to the first duct 36 (FIG. 3) and ultimately to the first seat effector 26 (FIGS. 2 and 3). The second air outlet 148 is fluidly connected to the second duct 38 (See also FIG. 3). The second duct 38 comprises a diverter 150, which then splits the second duct 38 into sub ducts 40, 42 (FIG. 3). Sub duct 40 is fluidly connected to second seat effector 28 (FIGS. 2, 3) and sub duct 42 is fluidly connected to second seat effector 30 (FIGS. 2, 3).

Figure 8B:
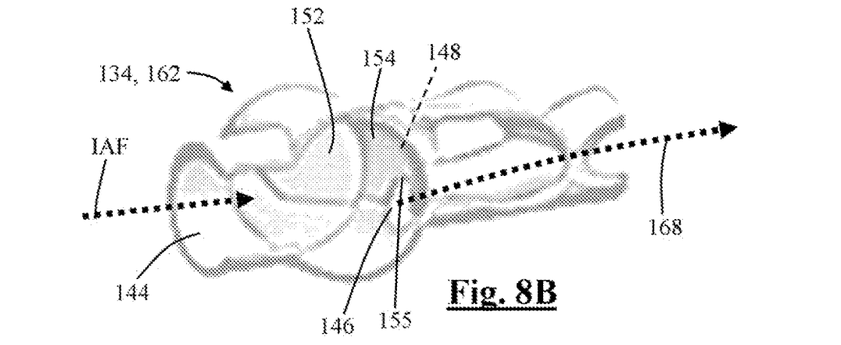
FIG. 8B is a cross-sectional view he air distribution device with the door in a second position.

The air distribution device 134 comprises a door 152. The door 152 comprises a curved or scooped portion 154 (FIG.

8B). The curved or scooped portion 154 comprises an aperture or notch 155 defined at a bottom an edge region of the door 152 (FIG. 8B).

The door 152 is operably connected to an actuator that is configured to move or rotate the door 152 into or between a plurality of door positions relative to the air outlets 146, 148 illustrated in the following FIGS. 8A-8D.

With continued reference to FIG. 8A, the door 152 in a first door position 160. After the door 152 is rotated into the first door position 160, both of the first and second air outlets 146, 148 are at least partially unobstructed or free from being blocked by the door 152. Accordingly. when the door 152 is in the first door position 160, an input air flow IAF from the air mover 32 is configured to flow into the air distribution device 134 through the air inlet 144 and then pass into and through both of the first and second air outlets 146, 148 along a respective first air flow path 168 and second air flow path 170. The first air flow path 168 is configured to then exit the air distribution device 134 and flow through the first duct 36 (FIG. 3) and ultimately exit the air distribution system 24 at the first seat effector 26 (FIGS. 2 and 3). The second air flow path 170 is configured to exit the air distribution device 134 then flow through the second duct 38 (FIG. 3), through each of the sub ducts 40, 42, before ultimately exiting the air distribution system 24 through the second seat effectors 28, 30 (FIGS. 2 and 3).

In the first door position 162, one of the outlets 146, 148, may be more obstructed than the other to reduce the amount of airflow through the corresponding outlet 146, 148. In other words, depending on the rotational position of the door 152 relative to the outlets 146, 148, more of the airflow may be directed to or through one of the outlets 146, 148 than through the other outlet 146, 148. This may be advantageous when an occupant wishes to have airflow through two or more effectors, but more or less airflow from one or more of the effectors than the other effectors.

FIG. 8B illustrates the door 152 in a second door position 162. After the door 152 is rotated into the second door position 162, only the first air outlet 146 is unobstructed or free from being blocked by the door 152. In the second door position 162, the second air outlet 148 is blocked or obstructed by the door 152. Accordingly, when the door 152 is in the second door position 62, the input air flow IAF is configured to flow into the air distribution device 134 through the air inlet 144 and then pass into and through only the first air outlet 146 along the first air flow path 168. The first air flow path 168 is configured to then exit the air distribution device 134 and flow through the first duct 36 (FIG. 3) and ultimately exit the air distribution system 24 through the first seat effector 26 (FIGS. 2 and 3). Because the door 152 blocks or obstructs the second air outlet 148, there is no second air flow path 170. Accordingly, air does not flow through the second duct 38 (FIG. 3), through any of the sub ducts 40, 42, or exit the air distribution system 24 through the second seat effectors 28, 30 (FIGS. 2 and 3).

Figure 8C:
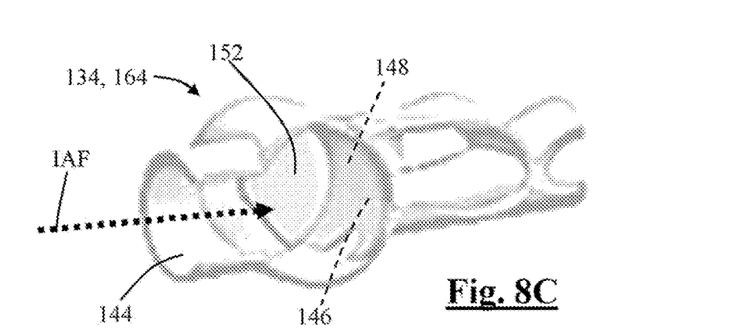
FIG. 8C is a cross-sectional view of the air distribution device with the door in a third position.

FIG. 8C illustrates the door 152 in a third door position 164. After the door 152 is rotated into the third door position 164, both of the first air outlet 146 and the second air outlet 148 are blocked or obstructed by the door 152. When the door 152 is in the third door position 164, because the door 152 blocks or obstructs both of the air outlet 146. 148, there is no first or second air flow paths 168, 170. Accordingly, no air flows through the first and second ducts 36, 38, the sub ducts 40, 42, or exits through any of the seat effectors 26, 28, 30.

Figure 8D:
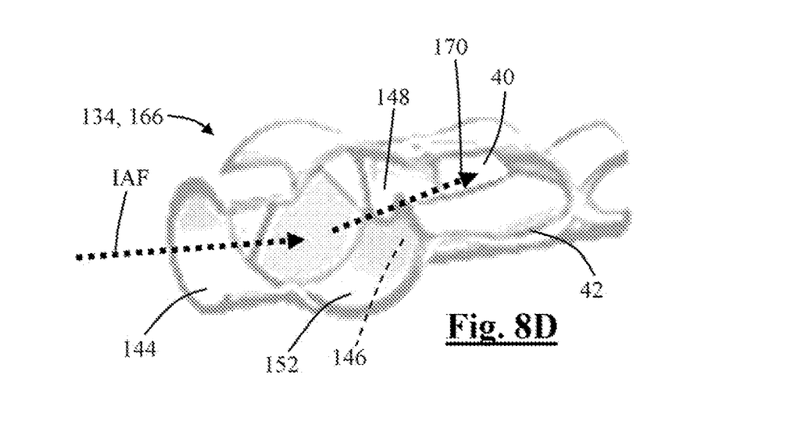
FIG. 8D is a cross-sectional view of the air distribution device with the door in a fourth position.

FIG. 8D illustrates the door 152 in a fourth door position 166. After the door 152 is rotated into the fourth door position 166, only the second air outlet 148 is unobstructed or free from being blocked by the door 152. In the fourth door position 164, the first air outlet 146 is blocked or obstructed by the door 152. Accordingly, when the door 152 is in the fourth door position 164, the input air flow IAF is configured to flow into the air distribution device 134 through the air inlet 144 and then pass into and through only the second air outlet 148 along the second air flow path 170. The second air flow path 170 is then configured to flow through the second duct 38 (FIG. 3), the sub ducts 40, 42, and ultimately exit the air distribution system 24 through the second seat effectors 28, 30. Because the door 152 blocks or obstructs the first air outlet 146. there is no first air flow path 168. Accordingly, air does not flow through the first duct 36 (FIG. 3) or exit the air distribution system 24 through the first seat effectors 26 (FIGS. 2 and 3).

Figure 9A:
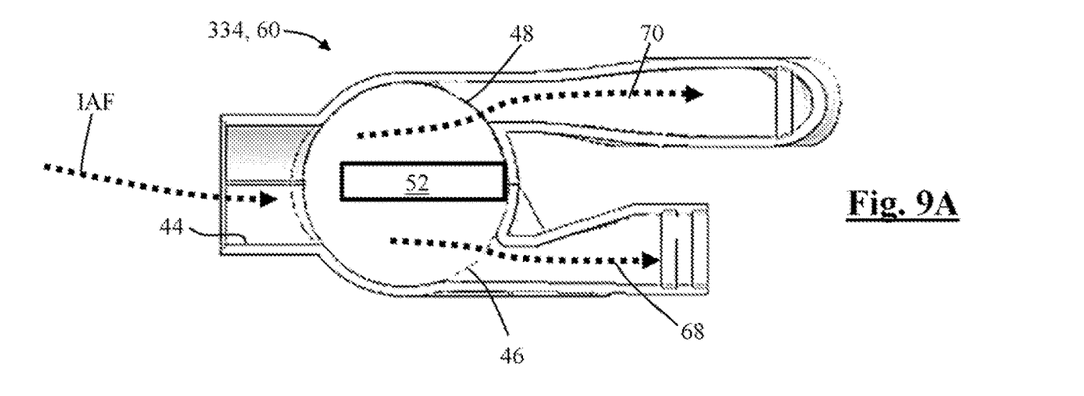
FIG. 9A is a cross-sectional view of the air distribution device with the door in a first position.
Figure 9B:
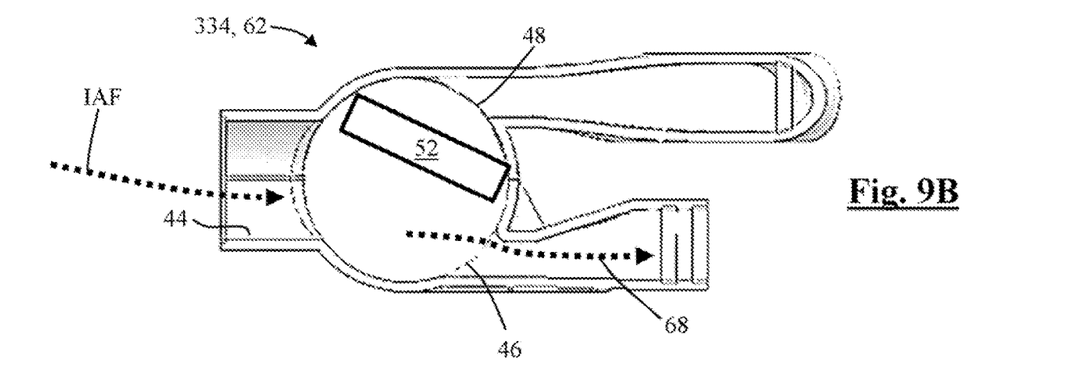
FIG. 9B is a cross-sectional view of the air distribution device with the door in a second position.
Figure 9C:
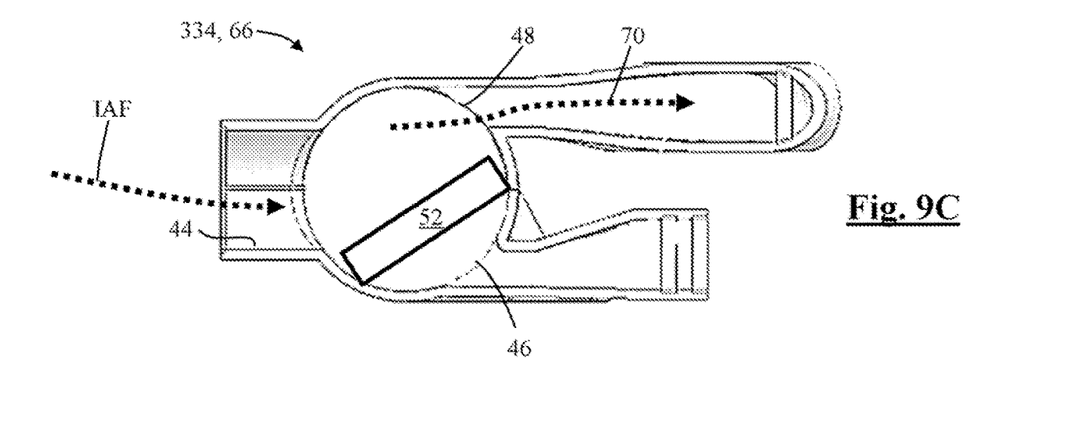
FIG. 9C is a cross-sectional view of the air distribution device with the door in a fourth position.

Another air distribution device 334 is illustrated in FIGS. 9A-9C. The air distribution device 334 may be used in place of the air distribution device 34, 134, and/or 234 illustrated and described above. The air distribution device 334 includes many of the same features illustrated and described above; thus, in the interest of brevity the like similar features will not be repeated again. However, it is understood those teachings from the other figures and paragraphs herein can be applied or incorporated into FIGS. 9A-9C and vice versa.

FIG. 9A illustrates the door 52 in a first door position 60 The door is rotated about one or more pivot points. The pivot points may be located at any region of the door and/or housing. After the door 52 is rotated into the first door position 60 by the actuator, both of the first and second air outlets 46, 48 are at least partially open, unobstructed, or free from being blocked by the door 52. Accordingly, when the door 52 is in the first door position 60, an input airflow IAF from the air mover 32 (FIG. 2) is configured to flow into the air distribution device 334 through the air inlet 44 and then pass into and through both of the first and second air outlets 46, 48 along a respective first air flow path 68 and second air flow path 70 and then exit the device 334. The first air flow path 68 is configured to then flow into and through the first duct 36 (FIG. 3) and ultimately exit the air distribution system 24 at the first seat effector 26 (FIGS. 2 and 3). At the same time, the second airflow path 70 is configured to flow through the second duct 38 (FIG. 3), through each of the sub ducts 40, 42, and ultimately exit the air distribution system 24 at the second seat effectors 28, 30 (FIGS. 2 and 3).

FIG. 9B illustrates the door 52 in a second door position 62. After the door 52 is rotated into the second door position 62, only the first air outlet 46 is at least partially unobstructed or free from being blocked by the door 52. In the second door position 62, the second air outlet 48 is blocked or obstructed by the door 52. Accordingly, when the door 52 is in the second door position 62, the input air flow IAF from the air mover 32 (FIG. 2) is configured to flow into the air distribution device 334 through the air inlet 44 and then pass into and through only the first air outlet 46 along the first air flow path 68. The first air flow path 68 is configured to then exit the device 334 through the first duct 36 (FIG. 3) and ultimately exit the air distribution system 24 via the first seat effector 26 (FIGS. 2 and 3). Because the door 52 blocks or obstructs the second air outlet 48, there is no second air flow path 70. Accordingly, air does not flow through the second duct 38 (FIG. 3), through any of the sub ducts 40, 42, or exit the air distribution system 24 through the second seat effectors 28, 30 (FIGS. 2 and 3).

FIG. 9C illustrates the door 52 in a fourth door position 66. After the door 52 is rotated into the fourth door position 66, only the second air outlet 48 is at least partially unobstructed or free from being blocked by the door 52. In the fourth door position 64, the first air outlet 46 is blocked or obstructed by the door 52. Accordingly, when the door 52 is in the fourth door position 64, the input air flow IAF from the air mover 32 is configured to flow into the air distribution device 334 through the air inlet 44 and then pass into and through only the second air outlet 48 along the second air flow path 70. The second air flow path 70 is then configured to flow exit the device 334 through the second duct 38 (FIG. 3), the sub ducts 40, 42, and ultimately exit the air distribution system 24 through the second seat effectors 28, 30. Because the door 52 blocks or obstructs the first air outlet 46, there is no first air flow path 68. Accordingly, air does not flow through the first duct 36 (FIG. 3) or exit the air distribution system 24 through the first seat effectors 26 (FIGS. 2 and 3).

The door 52 may be moved into another position, where one of the outlets 46, 48, is more obstructed by the door 52 than the other outlet 46, 48. This may allow a user or system to reduce or control the amount of airflow passing through the corresponding outlets 46, 48. In other words, depending on the rotational position of the door 52 relative to the outlets 46, 48, more airflow may be directed into or through one of the outlets 46, 48 than through the other outlet 46, 48. For example, more air flow may be directed through outlet 46 than 48 if the door 52 only partially blocks outlet 48, or vice versa. By limiting or changing the amount of airflow that enters an outlet 46, 48, the amount of airflow expelled by the effectors can be modified, controlled, or changed. This may be advantageous when an occupant wishes to have more airflow through certain effectors, but less airflow from other effectors.

It is understood that any design, component, element, feature, member, embodiment, etc. disclosed herein may be combined with any other design, component, element, feature, member, embodiment, etc. that is, features in device 34 may be combined with device 234 and/or 134, and vice versa Moreover, one or more of the elements, features, or members disclosed herein may be modified to fit certain applications, without departing from the scope or spirit of this disclosure. Furthermore, one or more of the elements, features, or members disclosed herein may be duplicated, eliminated, and/or combined with other elements, features, or members disclosed herein.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings.

Spatially relative terms, such as "inner," "outer," "beneath," below, "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications are incorporated by reference for all purposes. Other combinations are also possible as will be gleaned from the following claims, which are also hereby incorporated by reference into this written description.

The invention claimed is:

1. An air distribution device for use with distributing an airflow to a plurality of effectors on a vehicle seat, the air distribution device comprising:
    an air inlet;
    a first air outlet;
    a second air outlet; and
    a single barrel door having only a single airflow blocking wall comprising a curved wall;
    wherein the air distribution device comprises a single uninterrupted inlet passageway that extends between the air inlet and at least a region of the air distribution device in which the single barrel door is located to provide a substantially linear path for the airflow between the air inlet and at least the single barrel door;
    wherein an air mover is configured to generate and provide the airflow into the air distribution device through the air inlet, and the single barrel door is configured to be moved by an actuator into a plurality of door positions relative to the first air outlet and the second air outlet;
    wherein the curved wall of the single airflow blocking wall is connected to a second wall that is located in a plane that is substantially perpendicular to a tangential plane of the curved wall, the second wall comprises an arm that extends laterally outward from the second wall, the arm is connected to the actuator for moving the single barrel door into the plurality of door positions;
    wherein the plurality of door positions comprise: i) a first door position where both of the first air outlet and the second air outlet are unobstructed by the single airflow blocking wall so that the airflow passes into or through both of the first air outlet and the second air outlet; ii) a second door position where the second air outlet is blocked or obstructed by the single airflow blocking wall; iii) a third door position where both of the first air outlet and the second air outlet are blocked by the single airflow blocking wall so that the airflow is prevented from passing into or through both of the first air outlet and the second air outlet; and iv) a fourth door position where only the first air outlet is blocked or obstructed by the single airflow blocking wall; and wherein the air inlet is generally aligned with the first air outlet and the second air outlet so that the airflow is not substantially redirected between the air inlet and the first air outlet when the single barrel door is in the first door position and the second door position, and between the air inlet and the second air outlet when the single barrel door is in the first door position and the fourth door position.

2. The air distribution device according to claim 1, wherein the first air outlet and the second air outlet are generally parallel and adjacent to one another.

3. The air distribution device according to claim 1, wherein the first air outlet is connected to a first duct for moving the airflow to a first effector arranged at a first location at a back rest portion of the vehicle seat, and the second air outlet is connected to a second duct for moving the airflow to a second location arranged at the back rest of the vehicle seat.

4. The air distribution device according to claim 3, wherein the second duct comprises a diverter that splits the second duct into two sub ducts, wherein the airflow is split into the two sub ducts before exiting the air distribution device at the second location.

5. The air distribution device according to claim 4, wherein the first location is arranged at a neck region of the back rest of the vehicle seat, and the second location is at opposite shoulder regions of the back rest of the vehicle seat.

6. The air distribution device according to claim 1, wherein the second air outlet is split into two air paths, and wherein the plurality of effectors comprises two air effectors, and each of the two air paths lead the airflow to one of the two air effectors.

7. The air distribution device according to claim 6, wherein the plurality of effectors comprises a third air effector, the first air outlet is connected to the third air effector.

8. The air distribution device according to claim 7, wherein the third air effector is disposed between the two air effectors.

9. The air distribution device according to claim 1, wherein the air distribution device comprises a first duct connected to the first air outlet for moving the airflow to a first effector arranged at a neck region of the vehicle seat, wherein the air distribution device comprises a second duct connected to the second air outlet for moving the airflow to a second effector arranged at a shoulder region of the vehicle seat, and wherein the air distribution device comprises a diverter that splits the second duct into two sub ducts.

10. The air distribution device according to claim 1, wherein the air distribution device comprises a housing having a top part and a bottom part that are joined together to form the single uninterrupted inlet passageway; and downstream of the second air outlet, the bottom part comprises a first sub duct and a second sub duct.

11. The air distribution device according to claim 10, wherein the first sub duct and the second sub duct are arranged in a V-shape.

12. The air distribution device according to claim 1, wherein the air distribution device comprises a housing having a top part and a bottom part that are joined together to form the single uninterrupted inlet passageway; the first air outlet is defined in only the top part of the housing;

and after the airflow flows through the first air outlet, the airflow flows through a first outlet channel defined in only the top part of the housing; and wherein the second air outlet is defined in only the bottom part of the housing; and after the airflow flows through the second air outlet, the airflow flows through a second outlet channel defined in only the top part of the housing.

13. An air distribution device for use with distributing an airflow to a plurality of effectors on a vehicle seat, the air distribution device comprising:

an air inlet;
a first air outlet;
a second air outlet; and
a single barrel door having only a single airflow blocking wall comprising a curved wall;

wherein an air mover is configured to generate and provide the airflow into the air distribution device through the air inlet, and the single barrel door is configured to be moved by an actuator into a plurality of door positions relative to the first air outlet and the second air outlet;

wherein the curved wall of the single airflow blocking wall is connected to a second wall that is located in a plane that is substantially perpendicular to a tangential plane of the curved wall, the second wall comprises an arm that extends laterally outward from the second wall, the arm is connected to the actuator for moving the single barrel door into the plurality of door positions;

wherein the air distribution device comprises a single uninterrupted inlet passageway that extends between the air inlet and at least a region of the air distribution device in which the single barrel door is located to provide a substantially linear path for the airflow between the air inlet and at least the single barrel door;

wherein the air inlet is generally aligned with the first air outlet and the second air outlet so that the airflow is not substantially redirected between the air inlet and the first air outlet when the single barrel door is in a first door position and a second door position, and between the air inlet and the second air outlet when the single barrel door is in the first door position and another door position:

wherein the air distribution device comprises a housing having a top part and a bottom part that are joined together to form the single uninterrupted inlet passageway; the first air outlet is defined in only the top part of the housing, and after airflow flows through the first air outlet, the airflow flows through a first outlet channel defined in only the top part of the housing.

14. The air distribution device according to claim 13, wherein the second air outlet is defined in only the bottom part of the housing; and after the airflow flows through the second air outlet, the airflow flows through a second outlet channel defined in only the top part of the housing.

15. An air distribution device for use with distributing an airflow to a plurality of effectors on a vehicle seat, the air distribution device comprising:

an air inlet;

a first air outlet;
a second air outlet; and
a single barrel door having only a single airflow blocking wall comprising a curved wall;
wherein the air distribution device comprises a single uninterrupted inlet passageway that extends between the air inlet and at least a region of the air distribution device in which the single barrel door is located to provide a substantially linear path for the airflow between the air inlet and at least the single barrel door;
wherein an air mover is configured to generate and provide the airflow into the air distribution device through the air inlet, and the single barrel door is configured to be moved by an actuator into a plurality of door positions relative to the first air outlet and the second air outlet;
wherein the plurality of door positions comprise: i) a first door position where both of the first air outlet and the second air outlet are unobstructed by the single airflow blocking wall so that the airflow passes into or through both of the first air outlet and the second air outlet; ii) a second door position where the second air outlet is blocked or obstructed by the single airflow blocking wall; iii) a third door position where both of the first air outlet and the second air outlet are blocked by the single airflow blocking wall so that the airflow is prevented from passing into or through both of the first air outlet and the second air outlet; and iv) a fourth door position where only the first air outlet is blocked or obstructed by the single airflow blocking wall;
wherein the air inlet is generally aligned with the first air outlet and the second air outlet so that the airflow is not substantially redirected between the air inlet and the first air outlet when the single barrel door is in the first door position and the second door position, and between the air inlet and the second air outlet when the single barrel door is in the first door position and the fourth door position:
wherein the air distribution device comprises a housing having a top part and a bottom part that are joined together to form the single uninterrupted inlet passageway; the first air outlet is defined in only the top part of the housing; and after the airflow flows through the first air outlet, the airflow flows through a first outlet channel defined in only the top part of the housing; and
wherein the second air outlet is defined in only the bottom part of the housing; and after the airflow flows through the second air outlet, the airflow flows through a second outlet channel defined in only the top part of the housing.

* * * * *